United States Patent Office 3,236,210
Patented Feb. 22, 1966

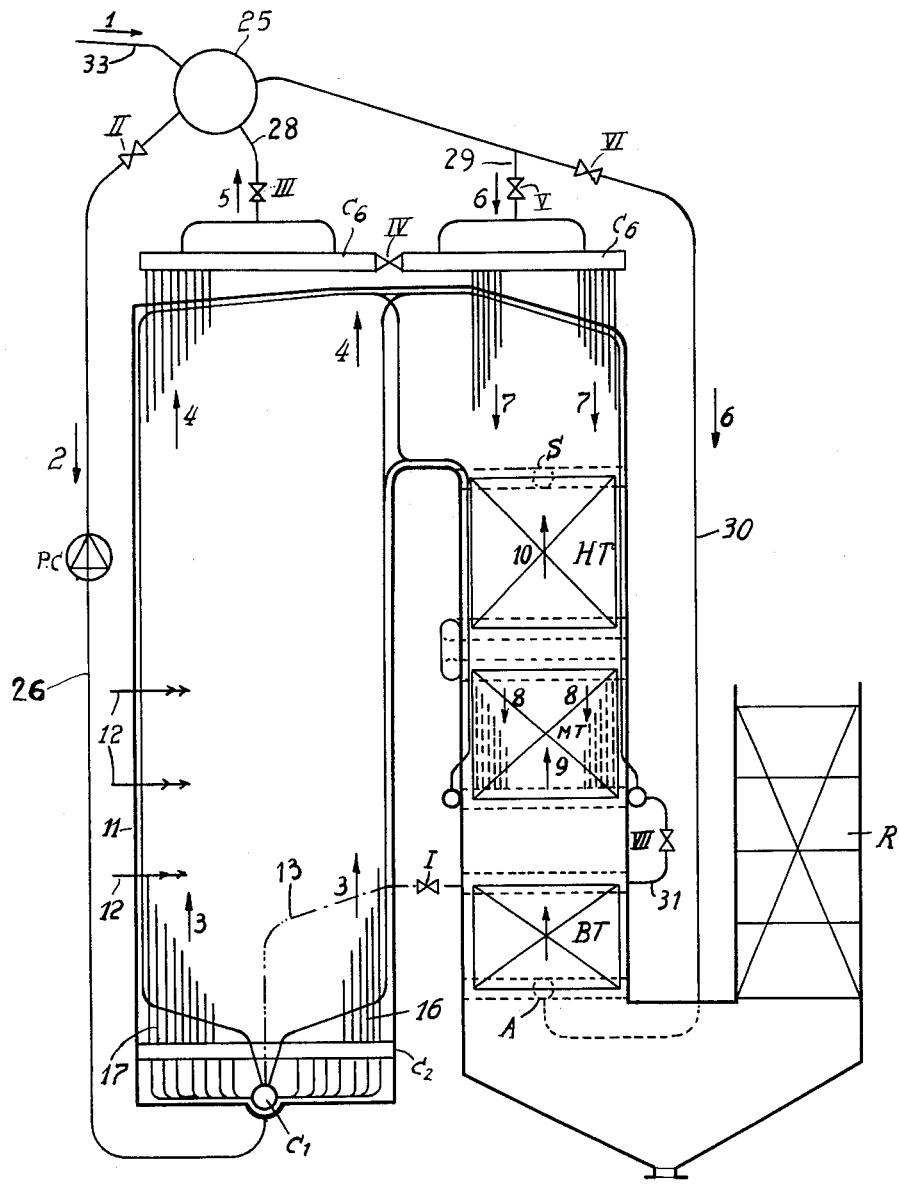

3,236,210
NUCLEAR POWER PLANTS WITH SUPERHEATER
Albert Henri Maurice Vandeghen, 10 Rue Sainte Marie, Liege, Belgium, and Nicolas Noel Salier, 4 Rue des Moineaux, Liege, Belgium
Filed Mar. 14, 1960, Ser. No. 14,587
Claims priority, application Belgium, Mar. 13, 1959, 576,661, 576,662
1 Claim. (Cl. 122—33)

The present invention relates to nuclear power plants wherein a superheater fired by fossil fuel is employed. More particularly, the invention concerns a steam generating plant which may be operated at will either with or without the nuclear reactor, a group of valves being provided to change from one type of operation to the other.

The invention may be applied to controlled circulation boilers and to those with forced circulation.

A controlled circulation-boiler differs from a natural circulation boiler by the provision of one or more circulation pumps in the tubing connecting the upper reservoir or steam-drum with the lower collectors of fire screens.

In order to apply the invention to such boilers, it is sufficient to arrange one or more pumps in the tubing connecting the reservoir with the lower furnace collector.

In the drawing, the single figure is a diagram illustrating a steam generating plant embodying the invention.

This plant includes a furnace 11, burners 12 and a separate superheater composed of four parts which are respectively mentioned in the order therethrough of flow of the steam to be superheated:

A low temperature superheater BT.
A set of fire box tubes or fire screen 17.
A medium temperature superheater MT.
A high temperature superheater HT.
An air re-heater R.

The flow of the steam with the nuclear reactor out of operation is indicated by the arrows consecutively numbered as 1 through 10 in the order of their numbering.

A supplementary boiler vessel or steam drum 25 is disposed above the fire box and superheaters and is connected (a) by a tube 26 with a valve II to the lower collector C1 of the furnace.
(b) by a tube 30 with a valve VI to the superheater BT.
(c) by the tubes 28, 29 with valves III and V to a collector C6 formed of two elements separated by a valve IV.

A connection 31 through a valve VII is provided between the medium and low temperature superheaters MT and BT, respectively. The reservoir 25 is fed with water by a tube 33.

A valve I is provided in the conduit 13 connecting the collector C1 at the bottom of the firebox with the low temperature superheater BT.

When the apparatus is fed with saturated steam from the nuclear reactor, the valves II, III, V, VI and VII are closed, the valves I and IV are opened and the apparatus operates solely as a superheater. The supplementary boiler vessel or drum 25 is completely disconnected by closure of the valves II, III, V and VI. The two portions of the collector C6 are interconnected through the open valve IV to operate as a single unit. Saturated steam from the nuclear reactor enters the bottom of the low temperature superheater BT at A and flows through the open valve I and line 13 to the bottom of the fire box wall tubes 17 through the collector C1. Steam flows upwardly through wall tubes 17 as indicated by arrows 3 and 4, horizontally through the collector C6, downwardly as indicated by arrows 7 and 8 through the wall tubes of the superheater and upwardly as indicated by arrows 9 and 10 through the medium temperature superheater MT and high temperature superheater HT to the utilization outlet S through which the fully superheated steam is withdrawn.

When the apparatus is fed with water instead of saturated steam, the valves I and IV are closed and the valves II, III, V, VI and VII are opened. Water is fed through line 3 to the upper reservoir or drum 25 and the apparatus behaves as a conventional boiler the low temperature superheater BT being fed with saturated vapour from the drum 25 through line 30.

According to the invention, in the case of controlled circulation boilers, a pump PC is connected in the water conduit 26 leading from the drum 25 to the lower collector C1 of the furnace.

What we claim is:

In a nuclear power plant having a superheater system adapted to operate as a non-nuclear steam generator when the production of saturated steam by the nuclear reactor is terminated, said superheater system comprising: a low temperature superheater, a medium temperature superheater, a high temperature superheater, a fire box including wall tubes and upper lateral collectors, means to feed saturated steam generated by said nuclear reactor from the same to the input portion of the low temperature superheater, at least one pipe leading from the output portion of the low temperature superheater to the low portions of the fire box wall tubes, conduit means connecting the output portions of the fire box wall tubes to the medium temperature superheater, a supplementary boiler vessel, a first valved pipe connecting the boiler vessel to the lower portion of the fire box screens, a second valved pipe connecting the boiler vessel to the low temperature superheater, a third valved pipe connecting the boiler vessel to the upper lateral collectors, and at least one circulation pump in the pipe connecting the boiler vessel to the lower portion of the fire box wall tubes to provide a controlled circulation boiler plant.

References Cited by the Examiner

UNITED STATES PATENTS

| 1,972,052 | 8/1934 | La Mont | 122—39 |
| 2,806,454 | 9/1957 | Jackson | 122—485 |
| 2,849,989 | 9/1958 | Vorkauf | 122—406 |
| 2,905,157 | 9/1959 | Schroeder et al. | 122—485 |
| 2,907,306 | 10/1959 | Stabenow | 122—406 |
| 2,997,032 | 8/1961 | Wedel | 122—33 |
| 3,007,456 | 11/1961 | Murray et al. | 122—33 |

FOREIGN PATENTS

| 1,189,953 | 3/1959 | France. |
| 679,083 | 9/1952 | Great Britain. |
| 809,240 | 2/1959 | Great Britain. |

FREDERICK L. MATTESON, JR., Primary Examiner.

SAMUEL LEVINE, JAMES W. WESTHAVER, PERCY L. PATRICK, Examiners.